(12) United States Patent
Feinberg et al.

(10) Patent No.: US 12,485,315 B2
(45) Date of Patent: Dec. 2, 2025

(54) PAUSING DELIVERED CONTENT DURING CONNECTED FITNESS ACTIVITY

(71) Applicant: Peloton Interactive, Inc., New York, NY (US)

(72) Inventors: Daniel Jeremy Feinberg, Jersey City, NJ (US); Jay Patel, Bloomfield, NJ (US); Tom Mudgett Mejia, New York, NY (US); Juan Erazo, Jupiter, FL (US); Deep Jayesh Parekh, Jersey City, NJ (US); Elise Vickery, New York, NY (US); Anand Chaturvedi, Kingston, NY (US)

(73) Assignee: Peloton Interactive, Inc., New York, NY (US)

( * ) Notice: Subject to any disclaimer, the term of this patent is extended or adjusted under 35 U.S.C. 154(b) by 219 days.

(21) Appl. No.: 18/557,746

(22) PCT Filed: Apr. 29, 2022

(86) PCT No.: PCT/US2022/026978
§ 371 (c)(1),
(2) Date: Oct. 27, 2023

(87) PCT Pub. No.: WO2022/232537
PCT Pub. Date: Nov. 3, 2022

(65) Prior Publication Data
US 2025/0073533 A1    Mar. 6, 2025

Related U.S. Application Data

(60) Provisional application No. 63/271,501, filed on Oct. 25, 2021, provisional application No. 63/182,359, filed on Apr. 30, 2021.

(51) Int. Cl.
A63B 24/00 (2006.01)
A63B 22/02 (2006.01)
(Continued)

(52) U.S. Cl.
CPC .......... *A63B 24/0084* (2013.01); *A63B 22/02* (2013.01); *A63B 22/0605* (2013.01);
(Continued)

(58) Field of Classification Search
CPC . A63B 24/0084; A63B 24/0062; A63B 22/02; A63B 22/0605; A63B 22/0664;
(Continued)

(56) References Cited

U.S. PATENT DOCUMENTS

2006/0205566 A1* 9/2006 Watterson ......... H04L 12/40045
                                                                  482/902
2008/0300110 A1* 12/2008 Smith ................ A63B 24/0003
                                                                  482/4

(Continued)

OTHER PUBLICATIONS

International Search Report and Written Opinion dated Aug. 19, 2022 for International Application No. PCT/US2022/026978.

*Primary Examiner* — Joshua T Kennedy
(74) *Attorney, Agent, or Firm* — AMPACC Law Group, PLLC

(57) ABSTRACT

Systems and methods for enabling users to pause interactive content, such as streamed exercise classes, and return to the classes without compromising their class performance statistics or metrics are described. For example, when a user decides to pause (e.g., they have to quickly handle something), they may have their rank removed from a leaderboard, with the leaderboard passing the ranking to the next user of the activity, while the user is still placed on the leaderboard according to an approximated position or ranking.

20 Claims, 12 Drawing Sheets

(51) Int. Cl.
    *A63B 22/06* (2006.01)
    *A63B 71/06* (2006.01)
    *A63F 13/795* (2014.01)
    *A63F 13/798* (2014.01)
    *A63F 13/816* (2014.01)

(52) U.S. Cl.
    CPC ...... *A63B 24/0062* (2013.01); *A63B 71/0622* (2013.01); *A63F 13/795* (2014.09); *A63F 13/798* (2014.09); *A63F 13/816* (2014.09); *A63B 2230/065* (2013.01)

(58) Field of Classification Search
    CPC ........ A63B 22/0694; A63B 2024/0065; A63B 2024/0068
    See application file for complete search history.

(56) References Cited

U.S. PATENT DOCUMENTS

| | | | |
|---|---|---|---|
| 2014/0038781 A1* | 2/2014 | Foley | A63B 71/0622 482/9 |
| 2015/0199078 A1* | 7/2015 | Pidhajecky | H04L 67/131 715/760 |
| 2017/0289651 A1* | 10/2017 | Swanson | G16H 20/30 |
| 2017/0354845 A1* | 12/2017 | Williams | G06T 11/60 |
| 2020/0306590 A1 | 10/2020 | Foley | |
| 2021/0299542 A1* | 9/2021 | Brammer | A63B 71/0669 |
| 2022/0143464 A1* | 5/2022 | Nishimoto | A63F 13/212 |
| 2023/0014880 A1* | 1/2023 | Gibbon | H04N 21/6543 |
| 2023/0019337 A1* | 1/2023 | D'Auria | A63B 71/0622 |
| 2025/0016395 A1* | 1/2025 | White | H04N 21/414 |
| 2025/0073533 A1* | 3/2025 | Feinberg | A63F 13/67 |
| 2025/0090934 A1* | 3/2025 | Negoita | A63B 71/0622 |

* cited by examiner

US 12,485,315 B2

PAUSING DELIVERED CONTENT DURING CONNECTED FITNESS ACTIVITY

CROSS REFERENCE TO RELATED APPLICATIONS

This application is a national phase entry of International Application No. PCT/US2022/026978 filed Apr. 29, 2022, which claims priority to U.S. Provisional Application No. 63/182,359, filed on Apr. 30, 2021, entitled PAUSING DELIVERED CONTENT DURING CONNECTED FITNESS ACTIVITY, and U.S. Provisional Application No. 63/271,501, filed on Oct. 25, 2021, entitled PAUSING DELIVERED CONTENT DURING CONNECTED FITNESS ACTIVITY, all of which are hereby incorporated by reference in their entirety.

BACKGROUND

The world of connected fitness is an ever-expanding one. This world can include a user taking part in an activity (e.g., running, cycling, lifting weights, and so on), other users also performing the activity, and other users doing other activities. The users may be utilizing a fitness machine (e.g., a treadmill, a stationary bike, a strength machine, a stationary rower, and so on), or may be moving through the world on a bicycle or other equipment.

The users can also be performing other activities that do not include an associated machine, such as running, strength training, yoga, stretching, hiking, climbing, and so on. These users can have a wearable device or mobile device that monitors the activity and may perform the activity in front of a user interface (e.g., a display or device) presenting content associated with the activity.

The user interface, whether a mobile device, a display device, or a display that is part of a machine, can provide or present interactive content to the users. For example, the user interface can present live or recorded classes, video tutorials of activities, leaderboards and other competitive or interactive features, progress indicators (e.g., via time, distance, and other metrics), and so on.

BRIEF DESCRIPTION OF THE DRAWINGS

Embodiments of the present technology will be described and explained through the use of the accompanying drawings.

Figure 1:
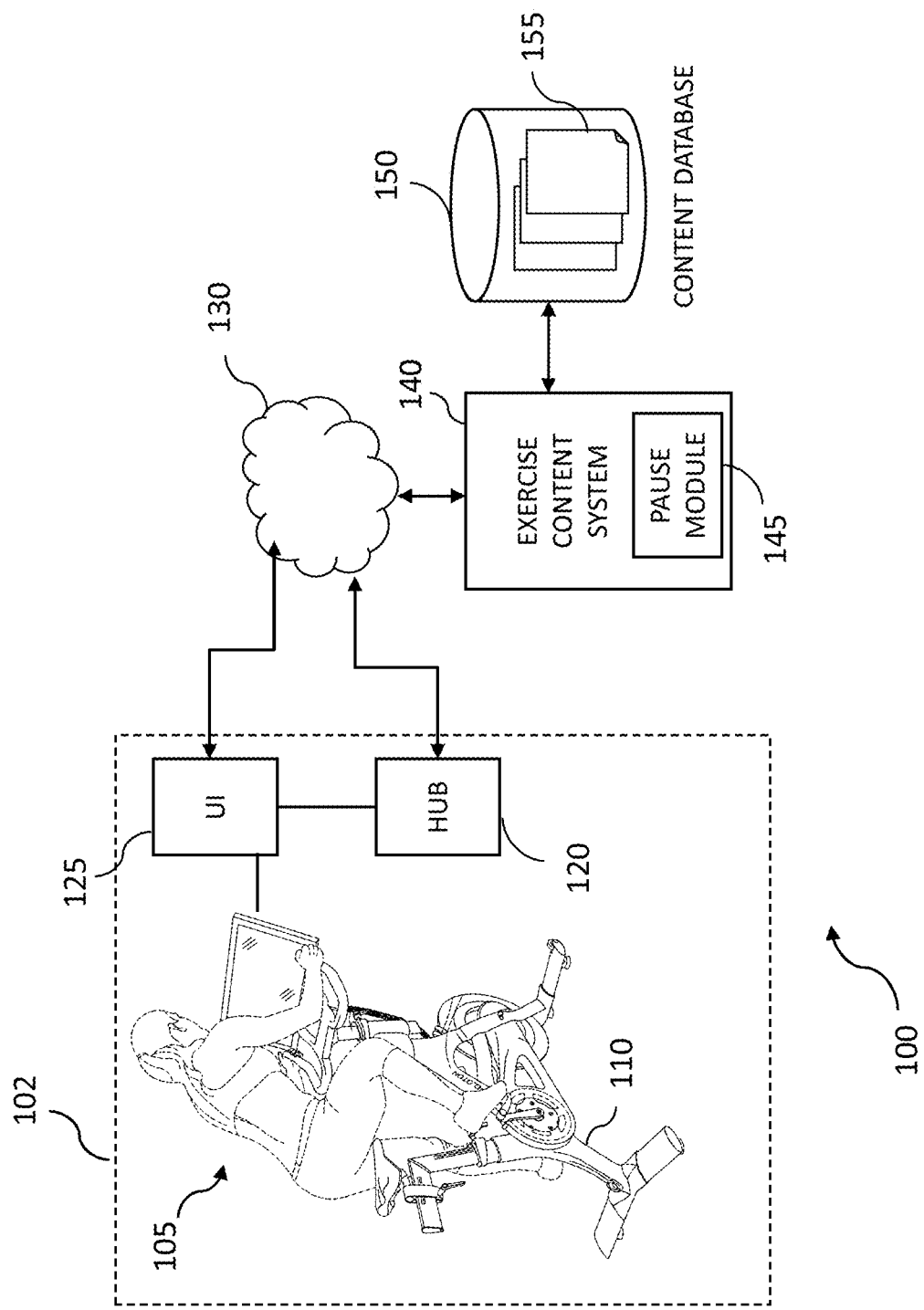
FIG. 1 is a block diagram illustrating a suitable network environment for users of an exercise system.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various systems and methods that enhance an exercise activity performed by a user are described. In some embodiments, the systems and methods enable users to pause interactive content, such as streamed classes, and return to the classes without compromising their class performance statistics or metrics. As described herein, the systems and methods can manage and/or update leaderboards associated with the interactive content. Such leaderboard management enables other members, who have not utilized a pause function, to perform activities while receiving the benefits of the leaderboard and associated systems, such as competitive rankings, among other benefits.

The systems and methods can implement the pause functionality for some users, without upsetting or diminishing the activities of other users, such as competitive users who do not utilize a pause during an activity. For example, when a user decides to pause (e.g., they have to quickly handle something), they may have their rank removed from a leaderboard, with the leaderboard passing the ranking to the next user of the activity. However, the member who paused can still obtain achievements, such as badges, personal records, aggregate statistics, and so on.

Further, the systems and methods can continue to track and present the user within the leaderboard (or other dynamically ranked context or list), providing the user with the benefit of competition, despite removing the user from the actual ranking for the class. Thus, the systems and methods can provide a fair and equitable mechanism for all users of a class or activity-those who pause a class but still want to have their performance tracked against other participants, and the other participants who may not want to be ranked against others who may gain an advantage from pausing/resuming a class, among other benefits.

Various embodiments of the system and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Suitable Exercise Platform

The technology described herein is directed, in some embodiments, to providing a user with an enhanced user experience when performing an exercise activity, such as an exercise activity as part of a connected fitness system or other exercise system. As described herein, the exercise activity can be a pre-recorded class, such as a ride, run, or row using an electric bicycle, treadmill, rower, and so on.

FIG. 1 is a block diagram illustrating a suitable network environment 100 for users of an exercise system. The network environment 100 includes an activity environment 102, where a user 105 is performing an exercise activity, such as a cycling activity or running activity. In some cases, the user 105 can perform the activity with an exercise machine 110, such as an exercise bicycle, treadmill, rower, strength machine, and so on. The exercise activity performed by the user 105 can include a variety of different workouts, activities, actions, and/or movements, such as movements associated with stretching, doing yoga, lifting weights, rowing, running, cycling, jumping, sports movements (e.g., throwing a ball, pitching a ball, hitting, swinging a racket, swinging a golf club, kicking a ball, hitting a puck), and so on.

The exercise machine 110 can assist or facilitate the user 105 to perform the movements and/or can present interactive content to the user 105 when the user 105 performs the activity. For example, the exercise machine 110 can be a stationary bicycle, a stationary rower, a treadmill, a weight machine, or other machines. As another example, the exercise machine 110 can be a display device that presents content (e.g., streamed classes, dynamically changing video, audio, video games, instructional content, and so on) to the user 105 during an activity or workout.

The exercise machine 110 includes a media hub 120 and a user interface 125. The media hub 120, in some cases, captures images and/or video of the user 105, such as images of the user 105 performing different movements, or poses, during an activity. The media hub 120 can include a camera or cameras, a camera sensor or sensors, or other optical sensors configured to capture the images or video of the user 105.

In some cases, the media hub 120 includes components configured to present or display information to the user 105. For example, the media hub 120 can be part of a set-top box or other similar device that outputs signals to a display, such as the user interface 125. Thus, the media hub 120 can operate to both capture images of the user 105 during an activity, while also presenting content (e.g., time-based or distance-based experiences, streamed classes, workout statistics, and so on) to the user 105 during the activity.

The user interface 125 provides the user 105 with an interactive experience during the activity. For example, the user interface 125 can present user-selectable options that identify live classes available to the user 105, pre-recorded classes available to the user 105, historical activity information for the user 105, progress information for the user 105, instructional or tutorial information for the user 105, and other content (e.g., video, audio, images, text, and so on), that is associated with the user 105 and/or activities performed (or to be performed) by the user 105.

The exercise machine 110, the media hub 120, and/or the user interface 125 can send or receive information over a network 130, such as a wireless network. Thus, in some cases, the user interface 125 is a display device (e.g., attached to the exercise machine 110), that receives content from (and sends information, such as user selections) an exercise content system 140 over the network 130. In other cases, the media hub 120 controls the communication of content to/from the exercise content system 140 over the network 130 and presents the content to the user via the user interface 125.

The exercise content system 140, located at one or more servers remote from the user 105, can include various content libraries (e.g., classes, movements, tutorials, and so on) and perform functions to stream or otherwise send content to the machine 110, the media hub 120, and/or the user interface 125 over the network 130.

A content database 150 stores content 155 (e.g., video files) that presents a pre-recorded class to a user. The content can include images, video, and other visual information that present the class, music and other audio information to be played during the activity, and various overlay or augmentation information that is presented along with the audio/video content. Further, the database 150 can include various content libraries (e.g., classes, movements, tutorials, and so on) associated with the content presented to the user during a selected experience.

As described herein, a pause module 145 can perform operations to cause video content to be paused or resumed. The pause module 145 can set parameters or rules associated with pausing content. For example, the pause module 145 can limit the number of pauses available to a user during a class, a total amount of time in which a class can be paused (e.g., 60 minutes in total), the time periods during the class when the class can be paused, and so on.

In some cases, the pause module 145 includes various data or message flows that facilitate the implementation of pausing a class (or, resuming a paused class), as well as flows that facilitate tracking or ranking of users who utilize the pause functionality (e.g., with respect to users who do not pause during a class or activity).

Further, the pause module 145 can perform auto-resume functions when users exceed pause limits or time windows. Further details regarding the functionality of the pause module 145 and the pausing capabilities within content are described herein.

FIG. 1 and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 130 can be any network, ranging from a wired or wireless local area network (LAN), to a wired or wireless wide area network (WAN), to the Internet or some other public or private network, to a cellular (e.g., 4G, LTE, or 5G network), and so on. While the connections between the various devices and the network 130 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices, wearable devices, or mobile devices (e.g., smart phones, tablets, laptops, smart watches), all manner of cellular or mobile phones, multi-processor systems, microprocessor-based or programmable consumer electronics, set-top boxes, network PCs, mini-computers, mainframe computers, AR/VR devices, gaming devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme). Portions of the system may reside on a server computer, while corresponding portions may reside on a client computer such as an exercise machine, display device, or mobile or portable device, and thus, while certain hardware platforms are described herein, aspects of the system are equally applicable to nodes on a network. In some cases, the mobile device or portable device may represent the server portion, while the server may represent the client portion.

Examples of Pausing an Exercise Class

As described herein, in some embodiments, the systems and methods enable the pausing of a streamed, archived, and/or pre-recorded exercise activity, such as a class attended, over time, by many members (e.g., 10s, 100s, and/or 1000s of members) of a connected fitness platform.

Figure 2A:
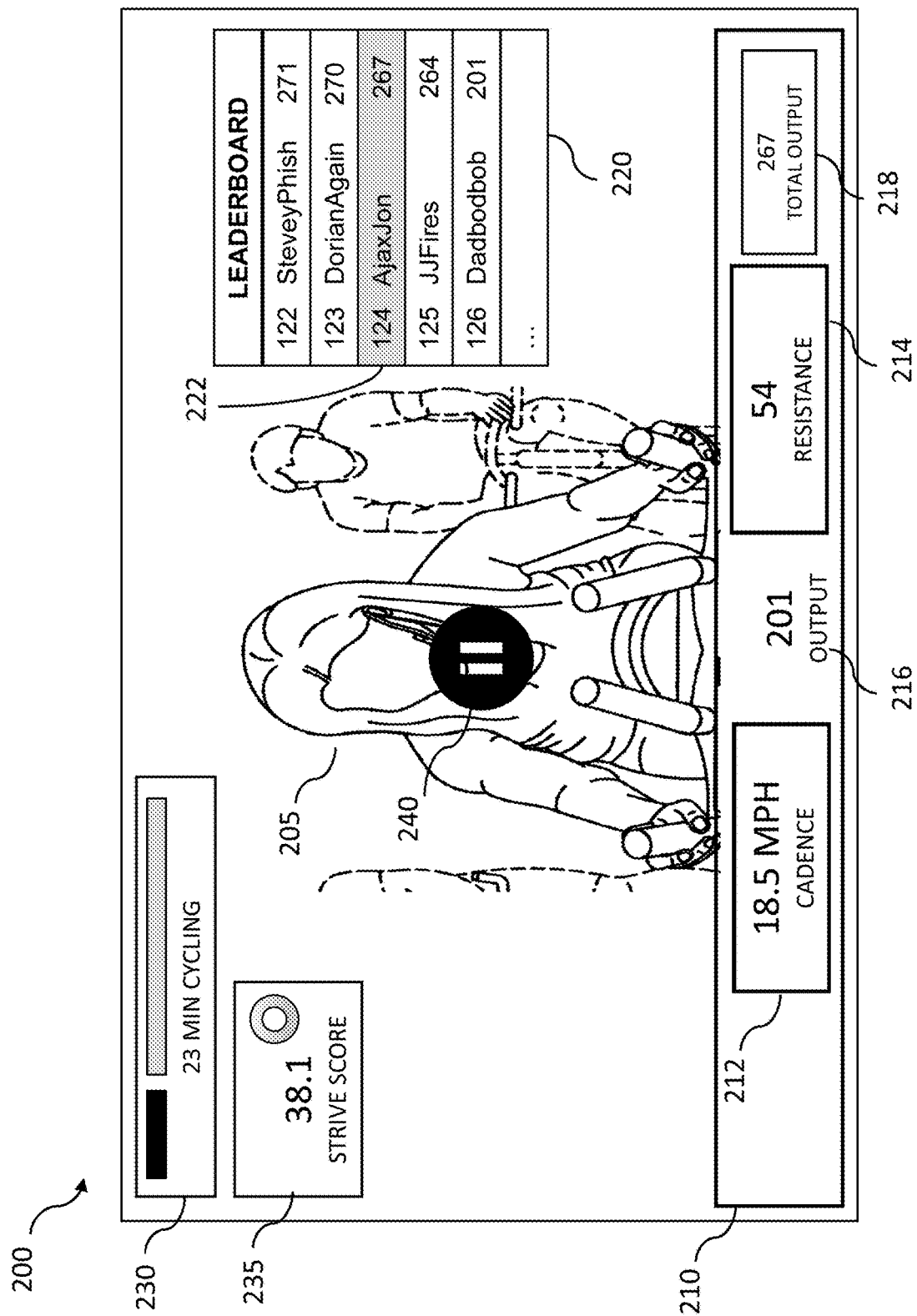
FIGS. 2A-2E are diagrams illustrating example user interfaces that facilitate pausing and resuming interactive content for a user performing an exercise activity.

FIGS. 2A-2E depict example user interfaces (UIs) that present various states or user interactions with an exercise class, such as an instructor-led cycling class. FIG. 2A depicts a user interface 200, which shows the exercise class having an instructor 205 running the class, which is followed by a user of the class. The user interface 200 includes a class metrics element 210, which displays various class and exercise machine metrics. For example, when the class is a cycling class, the element 210 shows a current cadence element 212, a resistance element 214, an output element 216 (e.g., determined from the cadence and resistance), and other elements, such as a total or aggregated output element 218, calories burned (not shown), estimate speed (not shown), heart rate information (not shown) and so on.

The user interface 200 also includes a leaderboard 220, which, as described herein, presents a dynamically changing ranked list of users of the class. The ranked list can include users that attended a live or initial playback of the class, as well as users that, later, attended a pre-recorded or archived version of the class.

For example, the leaderboard 220 displays the user "AjaxJon" 222 along with a current ranking of "124" based on their output (e.g., a total output of 267) at a certain time interval or duration of the class. The leaderboard 220 displays the ranking and position of the user with respect to other users of the class, based on their total output scores or metrics at the same time interval or duration when they performed the class.

In general, the leaderboard 220 can display the relative performance of all riders (or other activity users), or one or more subgroups of riders. For example, the user 222 may be able to select a leaderboard that shows the performance of riders in a particular age group, male riders, female riders, male riders in a particular age group, riders in a particular geographic area, and so on. Users may be provided with the ability to deselect the leaderboard 220 entirely and remove it from the screen.

Further, the UI 200 can incorporate various social networking aspects, such as allowing the user to follow other riders, or to create groups or circles of riders. Thus, user lists and information may be accessed, sorted, filtered, and used in a wide range of different ways. For example, other users can be sorted, grouped and/or classified based on any characteristic including personal information such as age, gender, weight, or based on performance such as current power output, speed, or a custom score.

The leaderboard 220 can be fully interactive, allowing the user to scroll up and down through user rankings, and to select a user to access their detailed performance data, create a connection (such as choosing to follow that user), or establish direct communication (such as through an audio and/or video connection). The leaderboard 220 can also display the user's personal best performance in the same or a comparable class, to allow the user to compare their current performance to their previous personal best. The leaderboard 220 can also highlight certain users, such as those that the user follows, other paused users, or provide other visual cues to indicate a connection or provide other information about a particular entry on the leaderboard.

In some cases, the leaderboard 220 can also allow the user to view their position and performance information at all times while scrolling through the leaderboard 220, regardless of whether they are ranked or their ranking has been removed. For example, when the user scrolls up toward the top of the leaderboard 220 (such as by dragging their fingers upward on a touchscreen display presenting the leaderboard 220), when the user's window reaches the bottom of the leaderboard, it will lock in position and the rest of the leaderboard will scroll underneath it. Similarly, when the user scrolls down toward the bottom of the leaderboard 220, when the user's window reaches the top of the leaderboard 220, it will lock in position and the rest of the leaderboard 220 will continue to scroll underneath it.

The user interface 200 also includes a timeline 230 element, which can present information identifying segments of a class (e.g., warmup, main section, cool down), movements of a class, and/or the user's progress within the class. Thus, the UI 200 can present information at any given time or position within a class that relates the user's rank or position within the leaderboard 220 to a position in the class within which the user is currently performing (e.g., cycling). The UI 200 can also include other metrics elements, such as a "strive score" element (or, effort score element) which can determine a score for the user based on the user's heart rate or other biometrics.

The user interface 200 also includes a pause button 240 or display element or icon. The pause button 240, is an actionable element, which, when selected by the user via the user interface (e.g., when the user taps the display screen), causes playback of the class to pause (via the playback module 145). The UI 200 can display the pause button 240 upon an initial tap of the screen by the user, which indicates an intention to pause the class by the user.

Figure 2B:
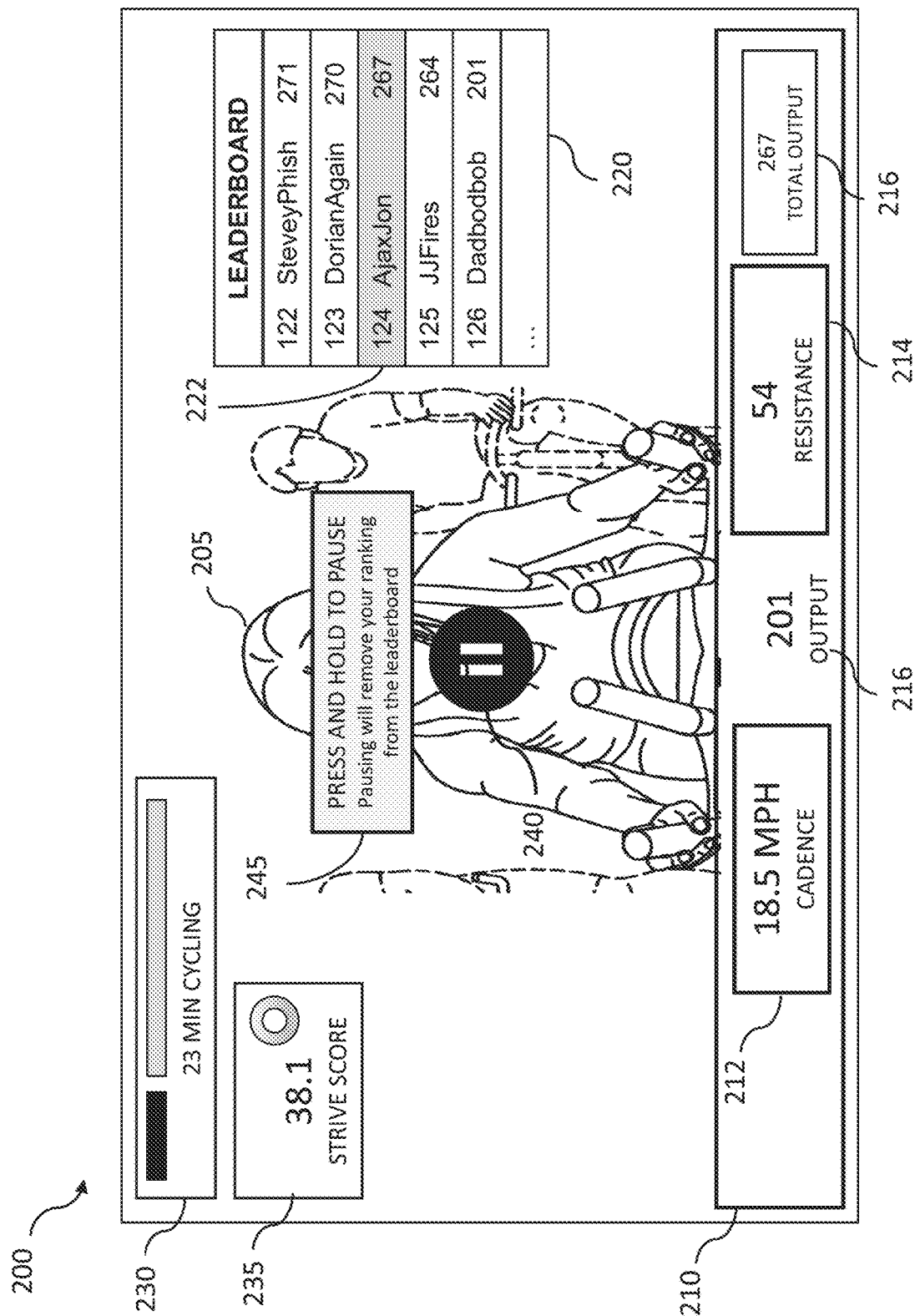

In some cases, as depicted in FIG. 2B, the user interface 200 can present a tool tip 245 or other information associated with the pause button 240. The tool tip 235, or dialog box, can provide guidance to a user about how to pause a class, how to resume a class, the effect of pausing on leaderboard ranking, and so on.

Figure 2C:
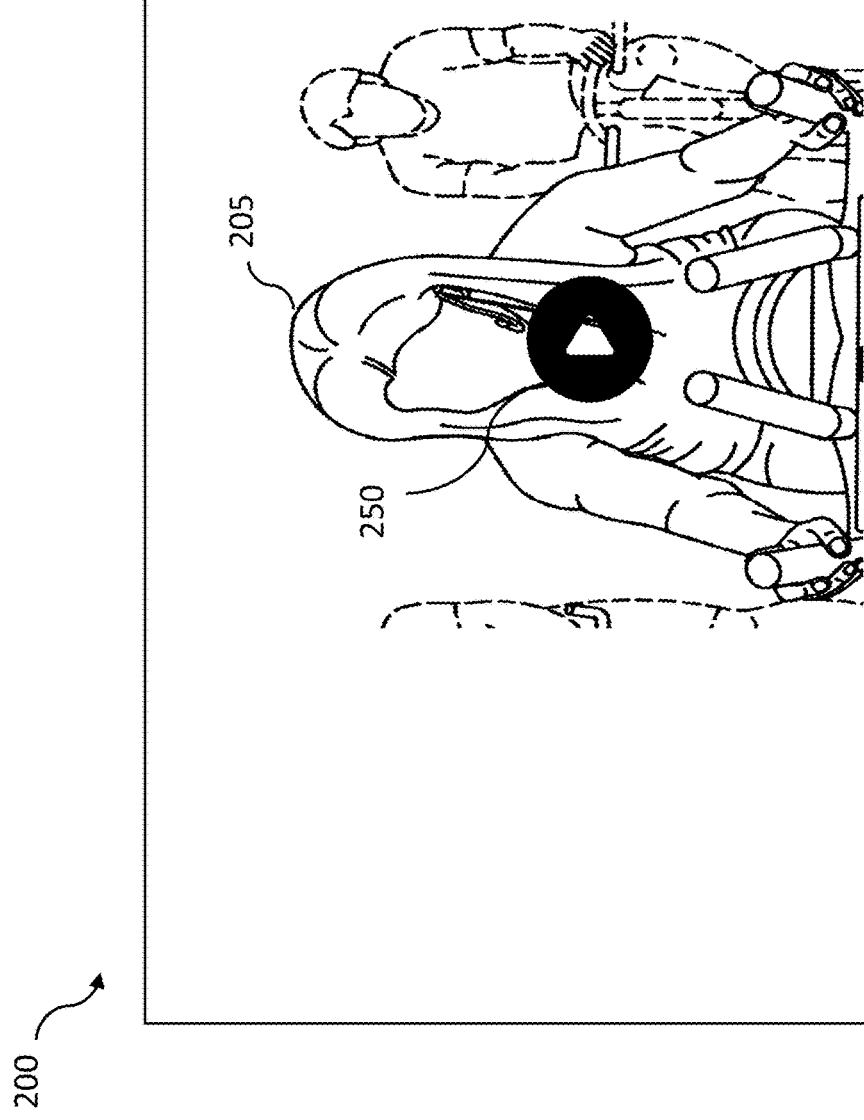

Once paused, the UI 200 can present the class in the paused state. For example, FIG. 2C depicts the exercise class in the paused state. The user interface 200 displays a resume button or play button 250 (or similar actionable element), but otherwise removes or hides other displayed content (other than the instructor 205), such as the various metrics or class information. For example, when paused, the video playback is paused, a timeline freezes, aggregate metrics freeze, and the other information can be removed from the screen. In some cases, a subset of information can be displayed, such as cadence, incline, speed, and so on, that are directly related to the exercise machine (e.g., exercise bicycle or treadmill) being used during the class.

In some cases, when the exercise machine is a treadmill, the paused screen may include other information or actionable elements that facilitate operation of the treadmill. For example, pausing the class can initiate a machine lock or screen lock mechanism, which locks or prevents the treadmill from operating when the user is not on or proximate to the treadmill. Thus, the UI 200 can include an unlock element, which the user selects to unlock the treadmill, before the UI 200 presents the class in the paused state.

In other cases, the pause module 145 can be part of the lock mechanism and pausing a class (via user selection of the pause button 240) can also or simultaneously lock the treadmill from operating. The play button 245, in such cases, can therefore be actionable to unlock the treadmill and resume the playback of the treadmill.

As described herein, in some embodiments, the pause module 145 is configured to present a paused user along with the leaderboard 220, even when the paused user (e.g., the user who has paused a class) is removed from an official or actual ranking of the class. For example, the user interface 200 can display paused users on the leaderboard 220 in the correct order (e.g., sorted by output) while the users are not considered when calculating the overall rankings for the class.

Figure 3:
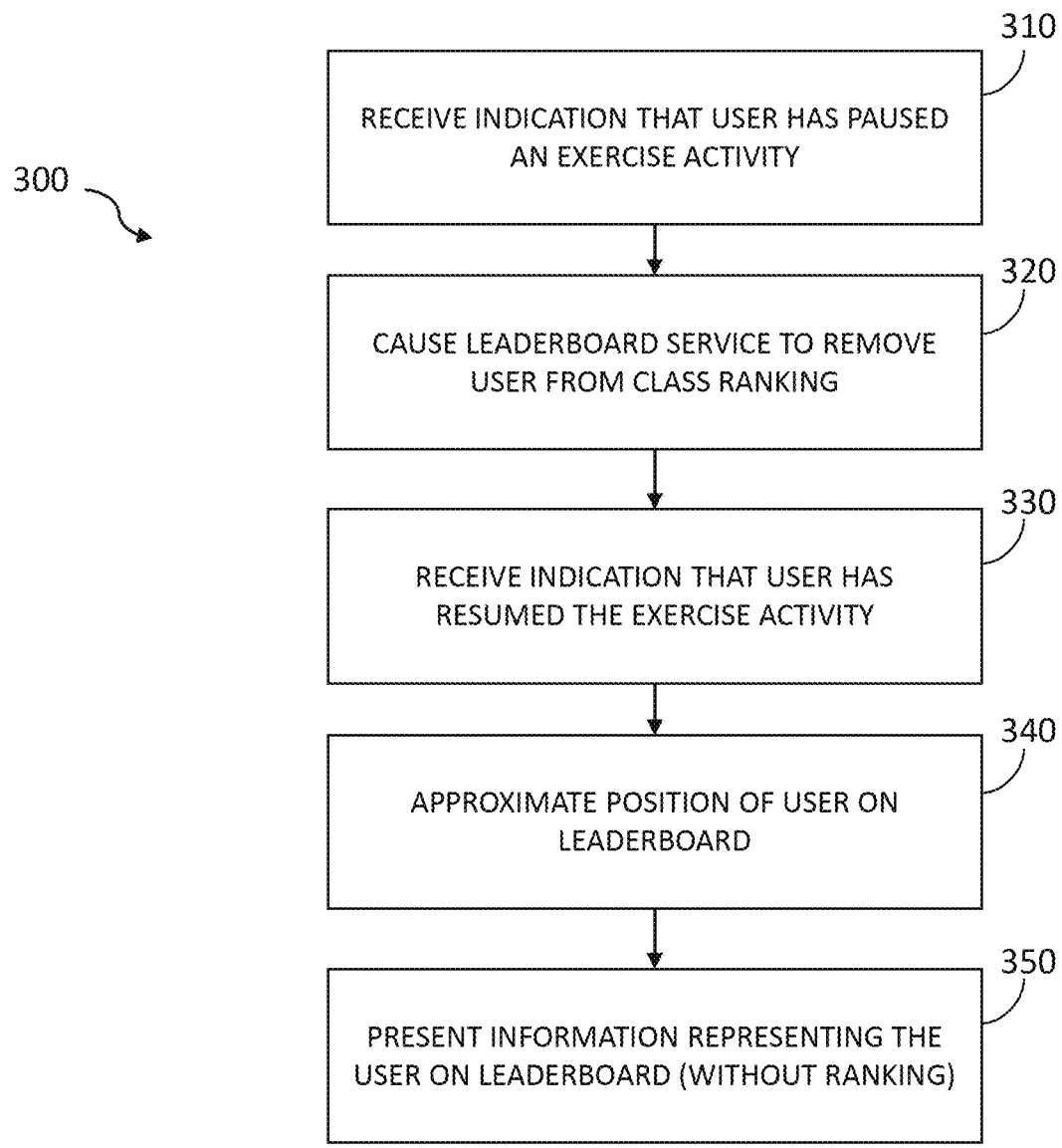
FIG. 3 is a flow diagram illustrating an example method for presenting activity information for a user during an exercise class.

FIG. 3 is a flow diagram illustrating a method 300 for presenting activity information for a user during an exercise class. The method 300 may be performed by the pause module 145 and, accordingly, is described herein merely by way of reference thereto. It will be appreciated that the method 300 may be performed on any suitable hardware (e.g., as part of a leaderboard system, service, or module).

In operation 310, the pause module 145 receives an indication that a user has paused an instructor-led class of an exercise activity. For example, the user has selected the pause button 240, providing the exercise machine with input to pause the class. The user can pause the class for a variety of reasons, including having to attend to something in their house or environment (e.g., a doorbell rings, a child is crying), having to attend to something associated with performing the activity (e.g., something is wrong with a clipped in shoe or their running shoes have become untied), and/or other issues or events that warrant pausing of the class but not ending the class.

In operation 320, the pause module 145 causes a leaderboard service to remove a ranking assigned to the user that paused the class. For example, as described in greater detail herein, the module 145 can update a field of a data structure associated with each user of the exercise class that identifies whether a user has paused the class or not paused the class.

In operation 330, the pause module 145 receives an indication that the user has resumed the instructor-led class of the exercise activity. For example, the user has attended to the distraction or event that caused the user to pause playback of the class, and selects the play button 245 presented by the UI 200.

In operation 340, the pause module 145 determines an approximate ranking for the user that paused the class. For example, because the user is no longer ranked within other users of the class, the pause module 145, via the leaderboard service, determines an estimation or approximation for a position of the user within the class with respect to other users of the instructor-led class. The approximation can be based on the output earned by the user as well as the number of users of the class.

In operation 350, the pause module 145 presents information (or causes the information to be presented), via the leaderboard service, representing the user on a leaderboard presented by the display of the exercise machine. For example, the pause module 145 can provide information to the leaderboard service that identifies the user as a paused user, and the leaderboard service renders or presents the user within the leaderboard (e.g., the leaderboard 220) based on the approximated position within the class (at a given time interval or position within the class).

Figure 2D:
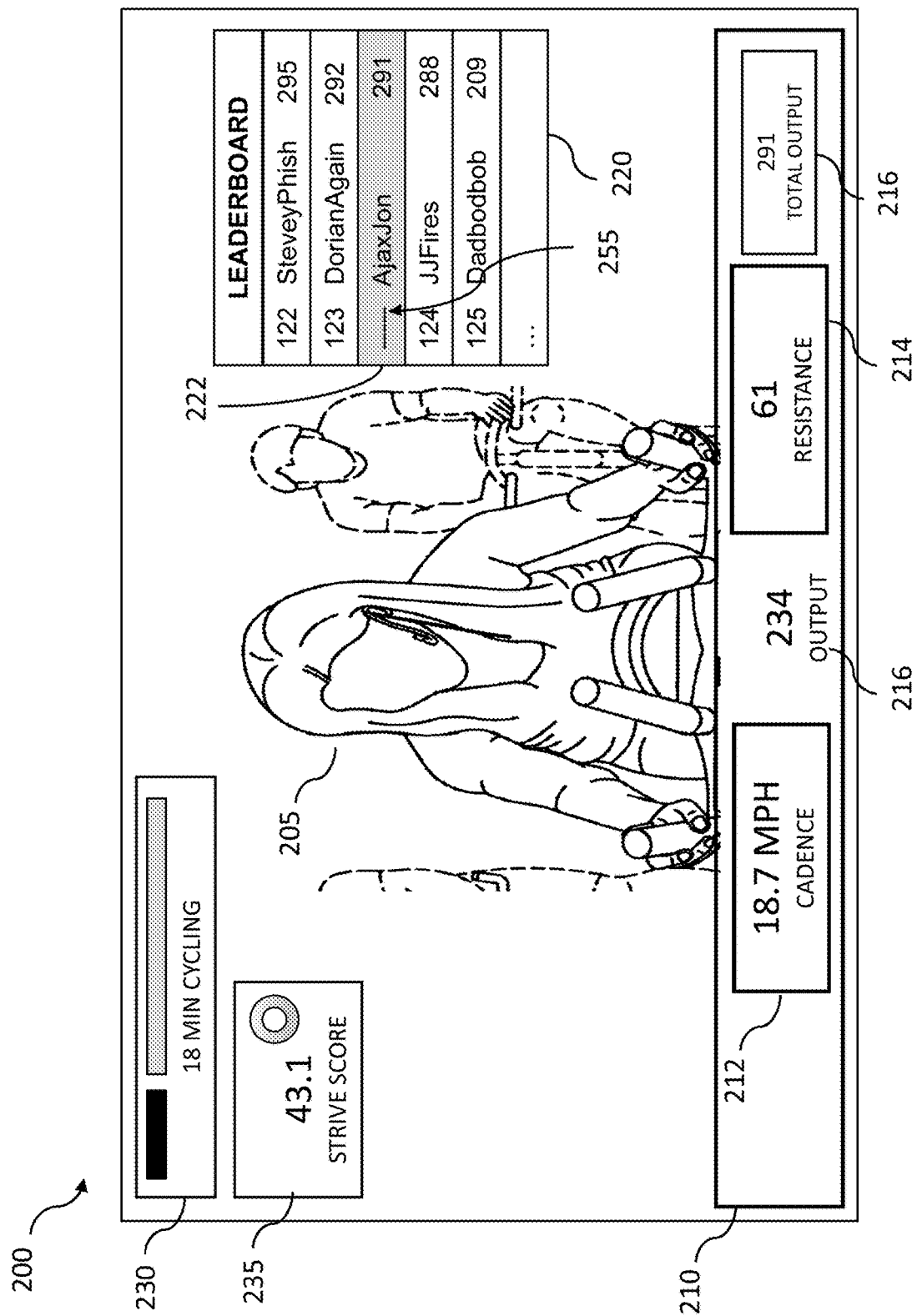

FIG. 2D depicts the user interface 200 presenting the leaderboard 220, which displays the user 222 at an approximated context or position with other users of the class. As shown, the user 222 remains on the leaderboard 220, despite pausing the class, in the order of their total output, but their rank is removed by the leaderboard service (e.g., the leaderboard presents an icon 255 representing a removed ranking for AjaxJon 222). Thus, the class ranking proceeds from the user right above the user AjaxJon 222 to the user right below the user 222.

Figure 2E:
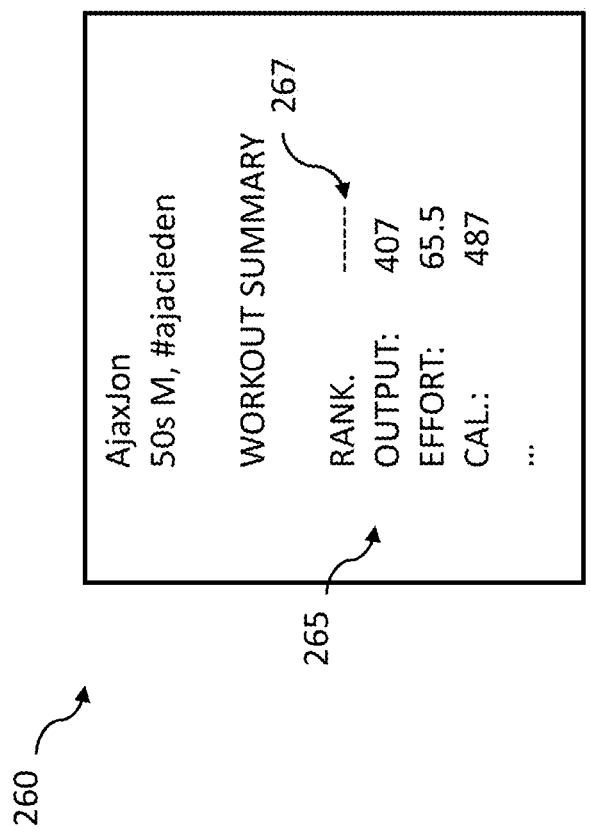

Once a class has been completed, the exercise content system 140 can update metrics or statistics associated with the user's performance. As shown in FIG. 2E, a workout scorecard 260 and summary reflect earned metrics 265 for the class, and a blank space 267 or value that indicates the user was not ranked in the class because of the pause action. Thus, the leaderboard 220 maintains the user's position on the leaderboard but does not assign (or otherwise removes) the user's overall ranking or placement amongst other users of the class.

As depicted, the workout history can include information or the metric 265 for the paused class, such as statistics, metrics, awards, achievements, and so on. The workout history also includes the indication (e.g., the icon 267) that the paused activity is not ranked or eligible for being ranked. However, pausing a class, in some cases, does not impact programs, challenges, or other achievements, streaks, milestones, records, and so on, associated with the user and/or the class.

In some cases, the pause module 145 can apply limits to the duration of a pause action, and/or the number of pause actions a user can and maintain attendance in the class. For example, the pause module 145 can set an individual maximum pause duration at a certain duration (e.g., 15 minutes or an hour) and/or can set a cumulative maximum duration (e.g., a total of an hour) or a total number of allowed pause actions (e.g., three or fewer) per class. In some cases, the limits can be based on the type of class, the duration of the class, the expertise level of the user, the type of machine of the user, and so on. In some cases, the pause module 145 can be applied to certain types of classes, such as all archived class, a subset of archived classes, and so on.

As described herein, the pause module 145 can interact with a leaderboard service or other application that coordinates or manages the leaderboard 220 or other dynamic ranked lists or rankings for a class or classes. The pause module 145 and/or the leaderboard service, utilizes various estimation or approximation techniques when placing a paused user or users onto a displayed leaderboard, such as the leaderboard 220 described herein.

In some cases, the pause module 145 estimates or approximates a rank for a user, such as a paused user, in order to mark them as paused for all other users (showing exact rank and skipping paused workouts) for various leaderboard displays, such as "Here Now" leaderboards, "Presence" leaderboards, "On Demand" leaderboards, among other leaderboard displayed to users.

Figure 4:
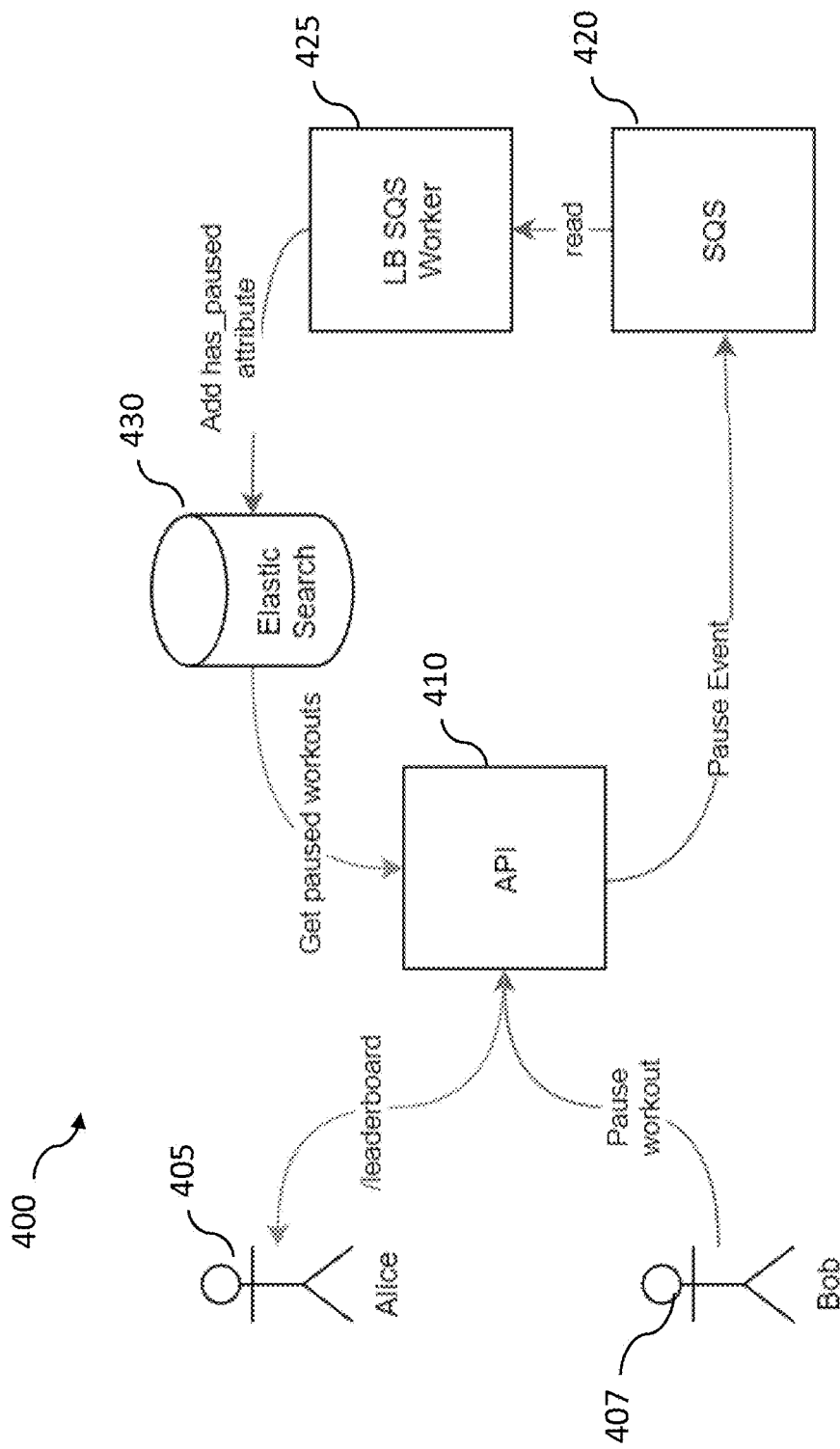
FIG. 4 is a block diagram illustrating components that update a leaderboard for a user of an exercise activity.

FIG. 4 depicts a network architecture 400 that provides an example scenario of presenting paused user information (e.g., output and/or approximate ranking) within the displayed leaderboards of users of a class or activity. In some cases, based on the various approximation implementation of the pause functionality when displaying information within an "all time" leaderboard (e.g., a leaderboard of every user that has taken a class), the pause module 145 (or associated leaderboard service) can update the endpoint to return a pause status for a given workout (e.g., the endpoint can be updated with an additional attribute for 'has_paused'). The pause module 145 can also modify information associated with a completed class or activity. For example, the module 145 can update workout summary and/or scorecard endpoints to short circuit for paused workouts (e.g., an update of the endpoint to have an additional field, 'has_paused', where paused workouts return a rank as '-1' and 'has_paused' as True). The workout history or scorecard can also display information about the pause, such as indicators identifying the occurrence of the pause, metrics before/after the pause, and so on.

For example, "bob" pauses his workout, and that information/indication is sent from his machine 407 to an API for the pause module 145 and/or leaderboard service coordinating the dynamically updating leaderboard information displayed to all users during the class. The API 410 transfers the pause indication to a cloud-based message queueing service (SQS) 420 of the leaderboard service, which reads the indication and sends it along to a LB (leaderboard) SQS (message queuing service) worker 425 specific or configured for pause events. The LB SQS worker 425 can save a "has_paused" attribute for the workout to a "Filters" cluster, such as an elastic search (ES) cluster 430.

The API, when obtaining information from the leaderboard service to update the leaderboards for users of the class (e.g., another user Alice 405) can exclude paused workouts from responses to the API (such as when workouts are saved to the ES cluster 430). In some cases, the leaderboard can include an Update Presence Dynamo DB schema having the "has_paused" field that defaults to false. The LB SQS worker can update the field instead, such as via an "UpdateWorkoutRequest" RPC (remote procedure call) request to the service. In some cases, the module 145 can use ElasticSearch to preserve consistency between leaderboard types.

The architecture 400, therefore, can support data flows that present information for users of a recorded, archived, or on-demand class that are currently in or viewing the class. The flow can include updating an "/leaderboard" endpoint to return a "has_paused" field for each workout; and storing a pause status in the ElasticSearch cluster 430 (or another cluster) and/or storing the information alongside the leaderboard data in Redis or another in-memory data store.

Figure 5A:
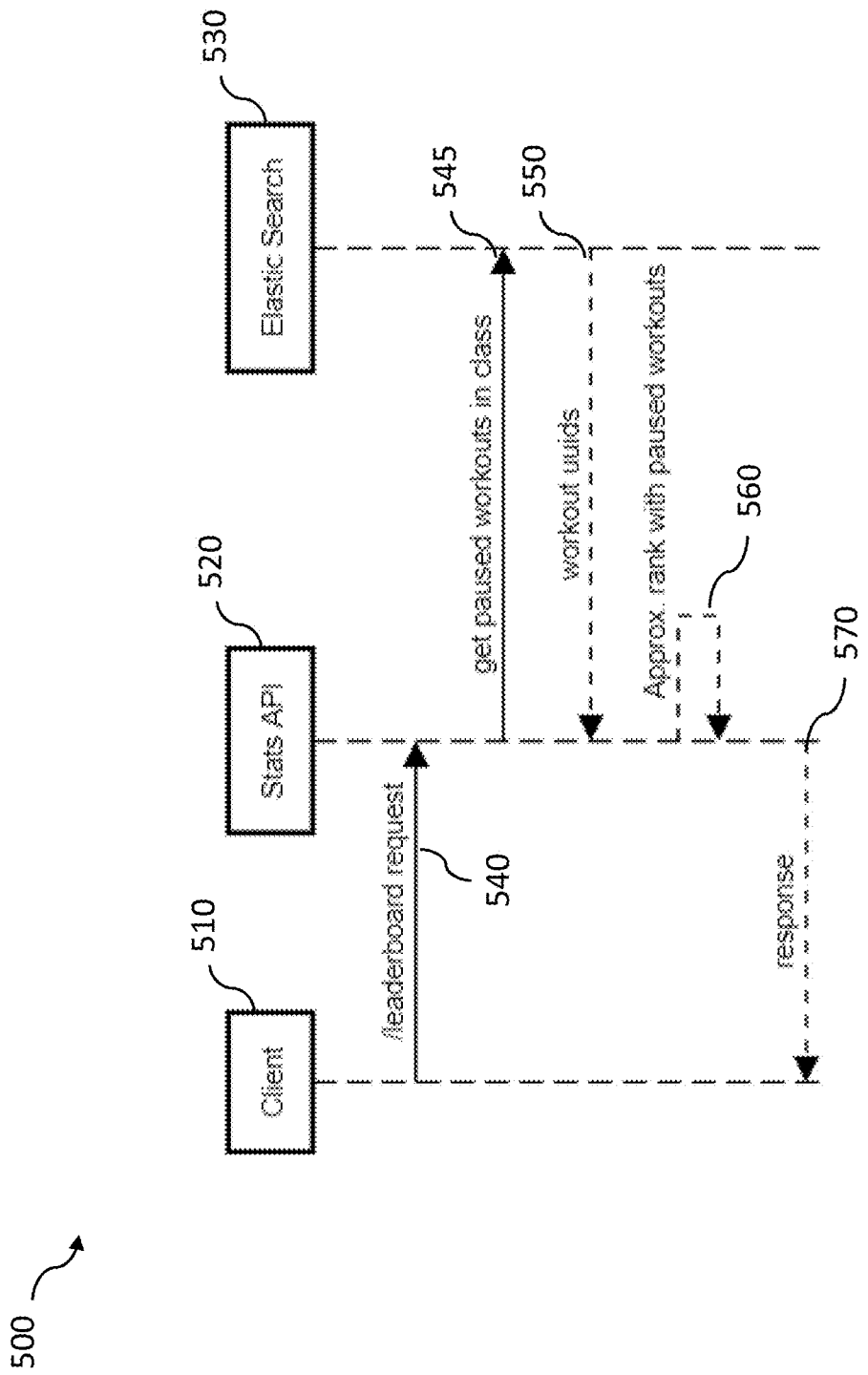
FIGS. 5A-5C are diagrams illustrating various workflows associated with pausing and/or resuming interactive content for a user performing an exercise activity.
Figure 5B:
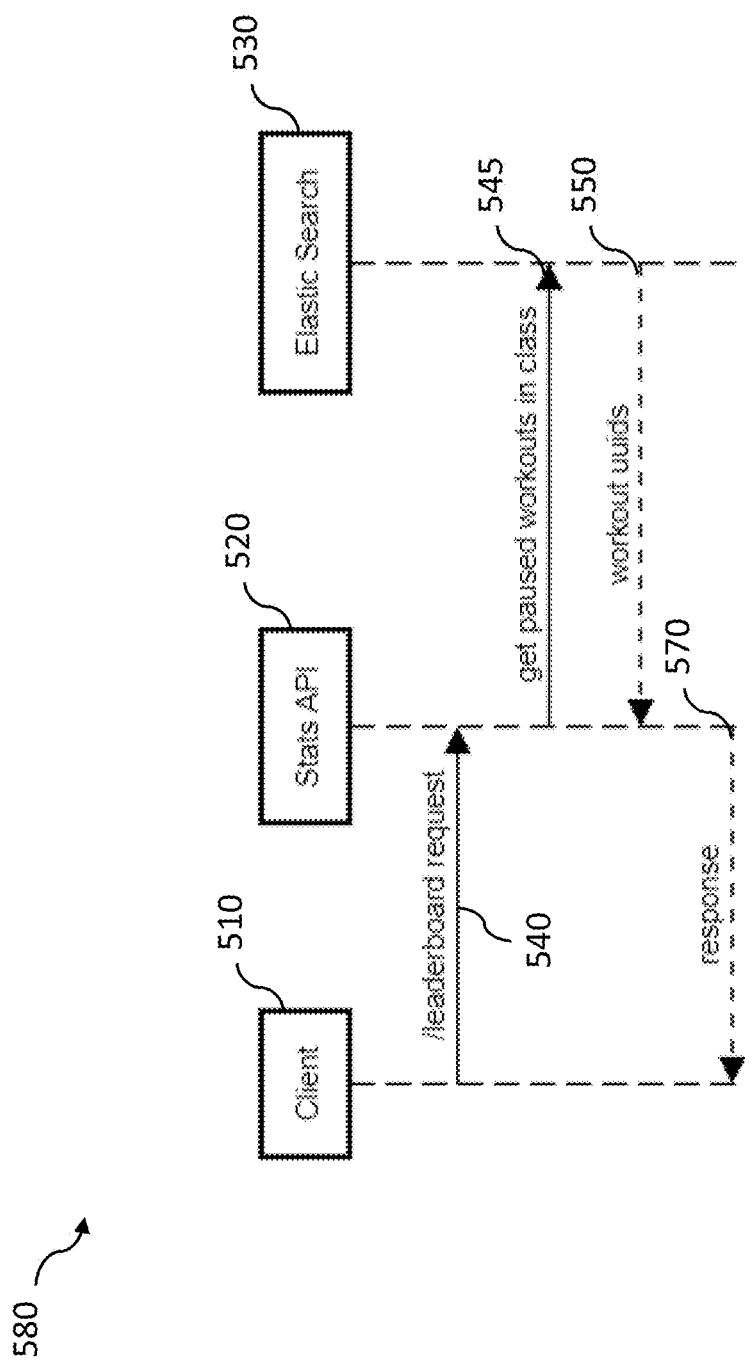
Figure 5C:
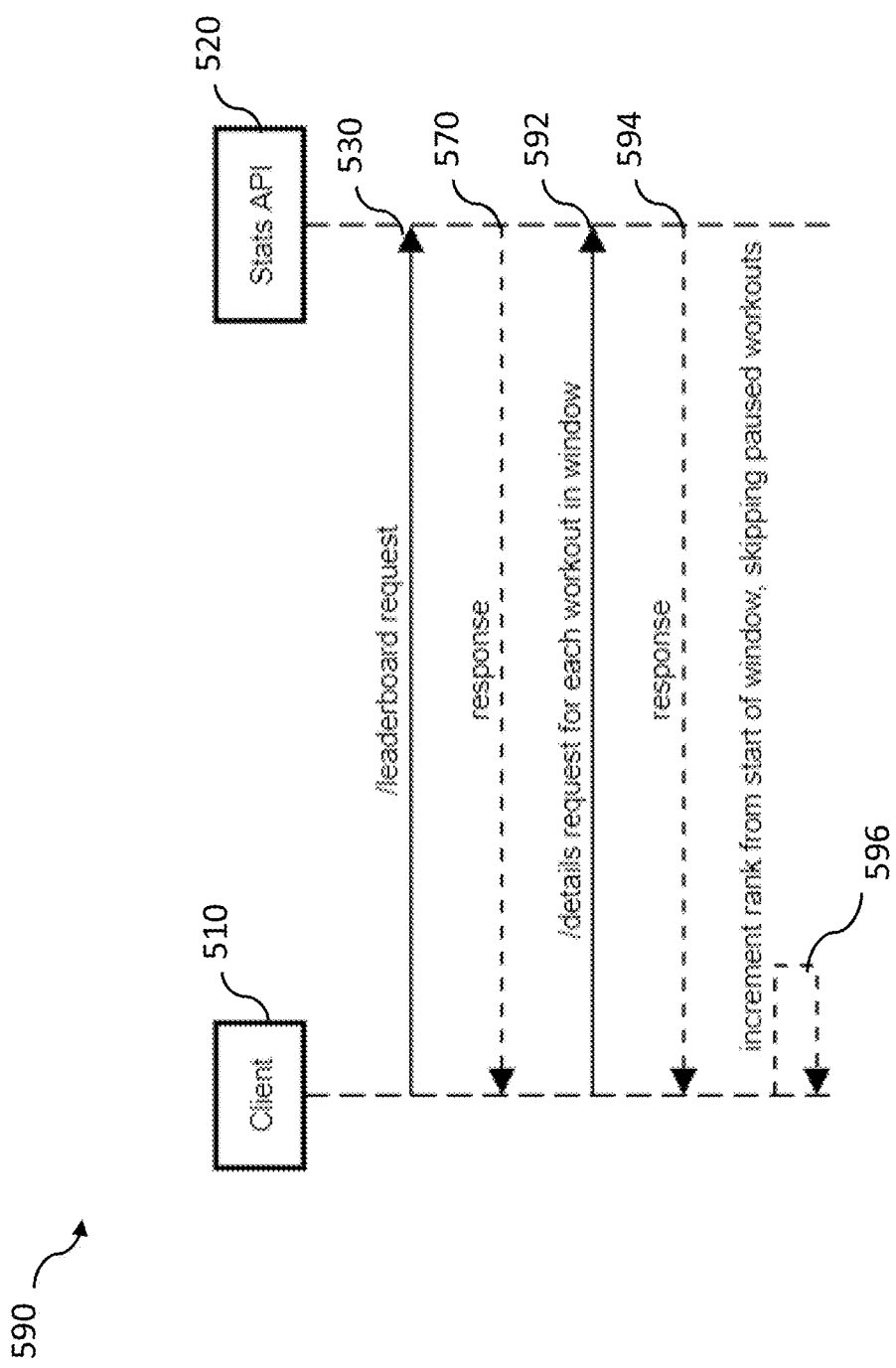

FIGS. 5A-5C depict data flows for estimating a ranking for a user, such as a user that paused their workout or class at some point during the class. As a first example, a data flow 500, between a client device 510 (e.g., machine or display), a stats API 520 (e.g., the API 410) and a search cluster 530 (e.g., the ES cluster 430, is based on an on-demand estimation ranking technique.

In response to a leaderboard request 540 from the client 510, the stats API 520 queries the ES 530 for the number of paused workouts 545 in a class (e.g., a value that can be cached), in some cases using an assumption that the paused workouts are evenly distributed across the users of a leaderboard.

To calculate an estimated starting rank for the paused user, the API 520 fetches an actual starting rank from the leaderboard service, and then subtracts an approximate number of paused workouts (e.g., from the workout uuids 550) before the actual starting rank. For each workout in the window returned by the/leaderboard request, the ES can include an attribute to the "has_paused," which is populated from the ES 530 and/or via workout details. For example, a class named Ride A has 100,000 workouts with 1,000 pauses. For a given request, the actual start rank is 10,000. Assuming an even distribution, ~100 paused workouts appear before the actual start rank. Therefore, the estimated start rank is 9,900. Thus, the API 520 generates an approximate rank 560, and responds 570 to the client 510 with the approximation.

FIG. 5B depicts data flows 520 during an on-demand actual start rank technique, which is similar to the data flow 500, without estimation of the starting rank. When paused workouts are not evenly distributed, users may find it difficult to distinguish any differences in starting rank. Thus, the pause module 145 may still skip over paused workouts when presenting leaderboard information.

For example, a class named Ride B has 100,000 workouts with 1,000 pauses. For a given request, the client 510 requests a window of users near the top of the leaderboard (e.g., ranking of top 50 users). Thus, even if the starting rank was one and all the other 49 workouts were paused, the client would start ranking the user at start rank one, when performing the estimation.

As another example, FIG. 5C depicts a data flow 590 during a client calculated rank technique. The data flow 590 operates to maintain a leaderboard without changes due to unranked users (e.g., paused users), and instead utilizes client behavior to keep track of paused users. The client 510 can call for workout details for each workout in a leaderboard window (e.g., all users above and below the paused user within a displayed section of the leaderboard) and increment the start rank returned from '/leaderboard' for the un-paused workouts.

Thus, the pause module 145 can utilize various estimation and/or approximation techniques when ordering a paused user on a leaderboard or portions of a leaderboard.

In addition, the pause module 145, in collaboration with various systems and components as described herein, can implement the pause functionality in a manner that enables a user to pause or resume a class in an optimal or useful manner, such as classes or portions where the user is moving at a high effort or exertion.

In some cases, the pause module 145 may operate along with a lock feature on a machine, such as a "tread lock" feature for a treadmill, which prevents movement of a treadmill belt until input is received from a user. Various interfaces can overlay with the pause interface, enabling the system to facilitate the use of tread lock with the pause functionality.

In some cases, a paused class may add a resume class portion, allowing a user to warm up to the stage of the class where the user paused. For example, the user paused during an interval portion of a bike class. Upon resuming the class (perhaps after a certain paused threshold time period), the class may add a pre-determined (e.g., 1 minute) or dynamically determined warmup portion before resuming the class at the paused interval portion, allowing the user to warm back up to their heart rate (e.g., via information received from an associated smart watch, gym kit, or heart rate monitor) or other performance activity indicators.

For example, the pause module 145 can receive a request from a user to resume a paused class, determine a current state of the user (e.g., a ready state based on a heart rate, effort/strive score, or estimated heart rate), and select warm up content (e.g., a portion of activity at certain parameters) to move the user to a ready state at which the user paused the class. In some cases, the module 145 can present the selection as a recommendation or option for the user to perform before resuming the class, where the user can opt out and move right to the class.

Figure 6:
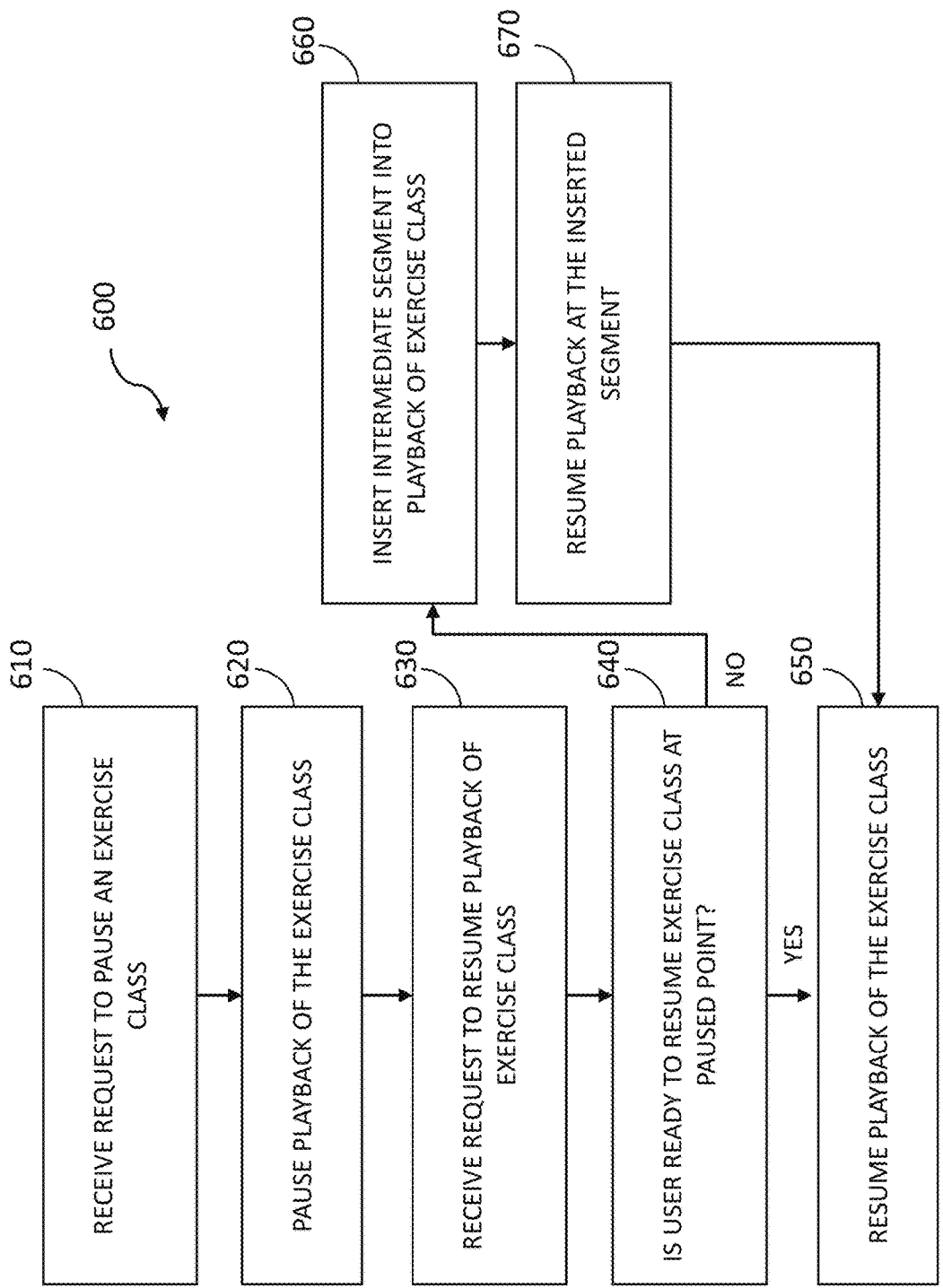
FIG. 6 is a flow diagram illustrating an example method for resuming playback of paused exercise content.

FIG. 6 is a flow diagram illustrating an example method 600 for resuming playback of paused exercise content. The method 600 may be performed by the pause module 145 and, accordingly, is described herein merely by way of reference thereto. It will be appreciated that the method 600 may be performed on any suitable hardware (e.g., as part of a leaderboard system, service, or module).

In operation 610, during an exercise class presented to a user performing an exercise activity on an exercise machine, the module 610 receives a request from the user to pause playback of the exercise class. For example, the user can select the pause button 240 of the UI 200 to pause a streaming, on-demand, instructor-led class.

In operation 620, the pause module 145 pauses playback of the exercise class in response to the received request. Once the user is available to resume the class, the user can provide input (e.g., select the play button 245 of the UI 200), and the pause module 145, in operation 630, receives a request from the user to resume the playback of the exercise class.

In operation 640, the pause module 145 determines a ready state for the user upon receiving the request to resume the playback of the exercise class. For example, the pause module 145 can determine whether to modify the presented class, or recommend modification, to move the user to a state (e.g., a state associate with a heart rate) appropriate for the segment of the class where the user is to resume the exercise activity.

The pause module 145 can determine the ready state in a variety of ways or via different metrics. Examples include:

The pause module 145 determines the ready state for the user by determining whether a current heart rate for the user is within a predetermined range associated with a heart rate (or other biometrics) of the user when the exercise class was paused. For example, when the class was paused, the heart rate for the user was 120 bpm, with a range of +/−10 bpm. The current heart rate for the user is 90 bpm (e.g., after a long pause), which is outside of the predetermined state. Thus, the pause module 145 determines the user is not in a ready state to resume the class at the pause point (e.g., when their heart rate was at 120 bpm);

The pause module 145 determines the ready state for the user by determining the user is always in a ready state when a heart rate of the user is below a threshold maximum heart rate when the playback of the exercise class is paused (e.g., below 100 bpm). For example, a low heart rate when the class was paused can indicate the user was still warming up or the class was still in a warm-up segment, and thus no additional warm up time is warranted to resume the class;

The pause module 145 determines the ready state for the user by determining the user is always in a ready state when a total output of the user performing the exercise class is below a threshold maximum output when the playback of the exercise class is paused;

The pause module 145 determines the ready state for the user by determining the user is never in a ready state when a segment of the exercise class performed by the user when the playback of the exercise class is paused is associated with a difficulty level above a threshold difficulty level. For example, when a user paused a class during an interval segment (e.g., a HIIT segment) or a segment where the user's output rate or performance metrics are above a certain threshold, the pause module 145 can determine the user is not ready to resume the activity at that segment without a warm-up segment, regardless of pause duration (or, once the pause duration is above a minimum level);

When the exercise machine is a treadmill, the pause module 145 determines the user is not in a ready state when a speed of the treadmill when the playback of the exercise class is paused is above a threshold speed. For example, if the speed of the treadmill is above a certain threshold (e.g., 10 mph), the pause module 145 determines the user is not ready to resume the activity at that segment without a warm-up segment, regardless of pause duration (or, once the pause duration is above a minimum level), in order to get the user back to the running speed in a smooth fashion; and/or When the exercise machine is an exercise bicycle, the pause module 145 determines the user is not in a ready state when a combination of cadence and resistance of the exercise bicycle when the playback of the exercise class is paused is above a threshold combination of cadence and resistance. For example, when the user pauses the class during a segment having a cadence range of 100+ rpm and a resistance level above 50 (or other high output combinations), the pause module 145 determines the user is not ready to resume the activity at that segment without a warm-up segment, regardless of pause duration (or, once the pause duration is above a minimum level, in order to get the user back to the output rate in a smooth manner; and so on.

When the user is ready to resume playback of the exercise class at the paused point or position (e.g., the heart rate of the user is like their heart rate when they paused the class), the method 600 proceeds to operation 650, and the pause module 145 causes the class to resume playback.

However, when the user is determined to not be ready to resume the class at the paused point (e.g., when the determined ready state indicates the user is not ready to resume the exercise class at the position of the exercise class at which the exercise class was paused), the method 600 proceeds to operation 660, and the pause module 145 can insert an intermediate segment of the exercise class into the playback of the exercise class. In some cases, instead of automatically inserting an intermediate segment or other additional content, the module 145 can present a recommendation to perform the intermediate segment or content.

The pause module 145 can insert content or segments in different ways, such as by reverting to a segment of the exercise class that is earlier to the segment of the exercise class when the exercise class was paused (e.g., moving back two minutes in the class when the segment started), inserting an additional segment (e.g., an intermediate segment) of the exercise class for a certain duration before resuming the playback of the exercise class at a position of the exercise class when the exercise class was paused; providing displayed instructions for the user to perform a warm-up, and so on.

In operation 670, the pause module 145 causes the intermediate segment to be presented to the user, such as by resuming playback of the exercise class at the inserted intermediate segment of the exercise class.

Thus, in some embodiments, the pause module 145 performs various techniques to prepare a user to resume a workout based on their level of effort when they paused the workout, the type or intensity of the workout, and so on. For example, the pause module 145 can receive a request from a user to pause playback of an exercise class, where the user is following the exercise class by performing an exercise activity on an exercise machine, pause playback of the exercise class in response to the received request, receive a request from the user to resume the playback of the exercise class, determine the heart rate for the user is outside of a heart rate range established by a heart rate for the user when the playback of the exercise class was paused, and present a recommendation to the user to perform a warm-up exercise activity before resuming the playback of the exercise class (or automatically provide the warm-up exercise activity).

In some cases, such as when an exercise machine supports an autofollow feature (e.g., where the machine automatically adjusts a resistance or speed of operation), the machine may modify its autofollow operation based on when the user pauses or resumes a class. For example, when the user pauses a class, the machine can stay fixed at the current resistance or speed, and only allow for manual adjustment. Further, the machine can resume autofollow at a subsequent interval (and not during the interval in which the class was resumed by the user).

Thus, in some cases, the pause module 145 can perform various actions when a user resumes a class to prepare the user to properly, safely, or optimally resume the class, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the technology may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A system, comprising:
a processor; and
one or more memories coupled to the processor, wherein the processor is configured to:
receive an indication that a user has paused an instructor-led class of an exercise activity, wherein the user is performing the exercise activity via an exercise machine having a display that presents:
   video content of the instructor-led class; and
   a leaderboard of at least a portion of users in the instructor-led class;
cause a leaderboard service to remove a ranking assigned to the user that paused the instructor-led class; and
receive an indication that the user has resumed the instructor-led class of the exercise activity; and
present information, via the leaderboard service, representing the user on the leaderboard presented by the display of the exercise machine,
   wherein the information representing the user includes information that approximates a position of the user within the instructor-led class with respect to other users of the instructor-led class.

2. The system of claim 1, wherein the processor is further configured to:
determine an approximate ranking for the user that paused the instructor-led class,
wherein the information representing the user on the leaderboard presented by the display of the exercise machine includes information that positions the user between the other users of the instructor-led class based on the determined approximate ranking for the user.

3. The system of claim 1, wherein the information representing the user includes information that positions the user within the instructor-led class with respect to other users of the instructor-led class but does not display an overall ranking for the user with respect to the other users of the instructor-led class.

4. The system of claim 1, wherein the exercise machine is an exercise bicycle.

5. The system of claim 1, wherein the exercise machine is a treadmill.

6. The system of claim 1, wherein the processor causes a leaderboard service to remove a ranking assigned to the user that paused the instructor-led class by updating a field associated with each user of the instructor-led class that identifies whether a user has paused the instructor-led class or not paused the instructor-led class.

7. The system of claim 1, wherein the indication that the user has paused an instructor-led class of an exercise activity is based on the user providing input via the display of the exercise machine to pause the instructor-led class.

8. The system of claim 1, wherein the instructor-led class is a pre-recorded class that includes other users contemporaneously taking the instructor-led class with the user and other users that have previously taken the instructor-led class.

9. The system of claim 1, wherein the processor is further configured to:
determine that the instructor-led class has been completed by the user; and
present information, via the leaderboard service, that indicates an overall performance of the instructor-led class by the user without presenting a comparative ranking with respect to other users that performed the instructor-led class.

10. A method, comprising:
presenting an exercise class to a user performing an exercise activity on an exercise machine;
receiving a request from the user to pause playback of the exercise class;
pausing playback of the exercise class in response to the received request;
receiving a request from the user to resume the playback of the exercise class;
determining a ready state for the user upon receiving the request to resume the playback of the exercise class; and
when the determined ready state indicates the user is not ready to resume the exercise class at the position of the exercise class at which the exercise class was paused, inserting an intermediate segment of the exercise class into the playback of the exercise class; and
resuming playback of the exercise class at the inserted intermediate segment of the exercise class.

11. The method of claim 10, wherein determining the ready state for the user upon receiving the request to resume the playback of the exercise class includes determining a current heart rate for the user is within a predetermined range associated with a heart rate of the user when the exercise class was paused.

12. The method of claim 10, wherein determining the ready state for the user upon receiving the request to resume the playback of the exercise class includes determining one or more biometrics for the user are within a predetermined range associated with the one or more biometrics of the user when the exercise class was paused.

13. The method of claim 10, wherein inserting an intermediate segment of the exercise class into the playback of the exercise class includes reverting back to a segment of the exercise class that is earlier to the segment of the exercise class when the exercise class was paused.

14. The method of claim 10, wherein inserting an intermediate segment of the exercise class into the playback of the exercise class inserting an additional segment of the exercise class for a certain duration before resuming the playback of the exercise class at a position of the exercise class when the exercise class was paused.

15. The method of claim 10, wherein determining a ready state for the user upon receiving the request to resume the playback of the exercise class includes determining the user is always in a ready state when a heart rate of the user is below a threshold maximum heart rate when the playback of the exercise class is paused.

16. The method of claim 10, wherein determining a ready state for the user upon receiving the request to resume the playback of the exercise class includes determining the user is always in a ready state when a total output of the user performing the exercise class is below a threshold maximum output when the playback of the exercise class is paused.

17. The method of claim 10, wherein determining a ready state for the user upon receiving the request to resume the playback of the exercise class includes determining the user is not in a ready state when a segment of the exercise class performed by the user when the playback of the exercise class is paused is associated with a difficulty level above a threshold difficulty level.

18. The method of claim 10, wherein the exercise machine is a treadmill, and wherein determining a ready state for the user upon receiving the request to resume the playback of the exercise class includes determining the user is not in a ready state when a speed of the treadmill when the playback of the exercise class is paused is above a threshold speed.

19. The method of claim 10, wherein the exercise machine is an exercise bicycle, and wherein determining a ready state for the user upon receiving the request to resume the playback of the exercise class includes determining the user is not in a ready state when a combination of cadence and resistance of exercise bicycle when the playback of the exercise class is paused is above a threshold combination of cadence and resistance.

20. A non-transitory computer-readable medium whose contents, when executed by an exercise machine, cause the exercise machine to perform a method, the method comprising:

receiving a request from a user to pause playback of an exercise class,
        wherein the user is following the exercise class by performing an exercise activity on an exercise machine;
    pausing playback of the exercise class in response to the received request;
    receiving a request from the user to resume the playback of the exercise class;
    determining the heart rate for the user is outside of a heart rate range established by a heart rate for the user when the playback of the exercise class was paused; and
    presenting a recommendation to the user to perform a warm-up exercise activity before resuming the playback of the exercise class.

\* \* \* \* \*